Aug. 22, 1961  J. C. WOODFORD  2,997,054
VACUUM BREAKER
Filed Dec. 17, 1958

INVENTOR.
JOSEPH C. WOODFORD
BY
ATTORNEY

United States Patent Office 2,997,054
Patented Aug. 22, 1961

2,997,054
VACUUM BREAKER
Joseph C. Woodford, 205 N. Buchanan St.,
Spring Lake, Mich.
Filed Dec. 17, 1958, Ser. No. 781,018
2 Claims. (Cl. 137—218)

My invention relates to a vacuum breaker provided with means for draining to prevent the freezing of sillcocks, with consequent damage, when equipped with a vacuum breaker and back flow preventing means.

The general construction of the vacuum breaker and back flow preventing means disclosed herein is the subject matter of my co-pending application, Serial No. 780,807 filed December 16, 1958.

Sill-cocks are used commonly to provide water hose connections on the outside walls of buildings, and, therefore, are subject to freezing and damage unless they are drained during freezing temperatures.

Sill-cocks are of two general types of design, to wit, one having the valve in the head of the sill-cock which is outside the building, and the other type wherein the valve is located remote from the sill-cock head and inside the building. The latter type of sill-cock is known as a "freezeless" type.

The first, or outside, valve type of sill-cock is commonly and almost invariably installed with a "stop-and-waste" valve in the supply pipe within the building, to permit shutting off the supply pipe and the draining of the exposed head and piping during cold weather.

The freezeless type of sill-cock is not ordinarily equipped with a "stop-and-waste" valve in the supply pipe as the sill-cock valve is installed in the building with the head and exposed piping being drained automatically after each operation.

When vacuum breakers are installed on the threaded outlet nozzles of sill-cocks, it is commonly required that the vacuum breaker be secured and permanently attached, such as by means of a tamper-proof lock crew, to prevent easy removal.

Due to the inherent operational principles of vacuum breakers, outside valve sill-cocks equipped with vacuum breakers cannot be drained in the ordinary manner, because air cannot pass inwardly through the vacuum breaker, and the drainage pressure, or drainage head, is not sufficient to open the valve in the outward or flow direction. Thus, with a vacuum breaker attached rigidly to a sill-cock, the sill-cock can be safely drained only by disassembling the vacuum breaker, which, of course, tends to defeat the very purpose of a permanent, or tamper-proof, installation of vacuum breaker.

The object of my invention is to provide means whereby a vacuum breaker can be securely and permanently attached to a sill-cock, and also permit convenient draining of the sill-cock and related piping without disassembling of the vacuum breaker.

My invention includes the various novel features of construction and arrangement hereinafter more definitely specified with reference to the accompanying drawings.

In said drawings, FIG. 1 is a side elevation of my improved vacuum breaker installed on the screw-threaded spout of a common and well-known form of sill-cock.

Figure 1:
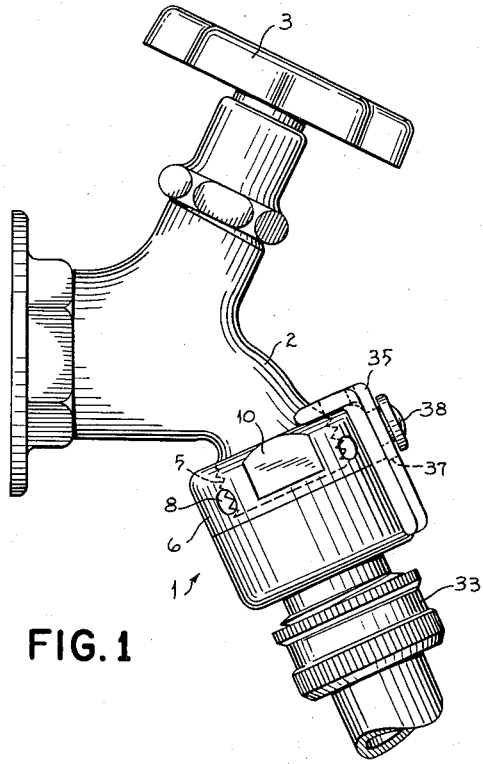
Figure 2:
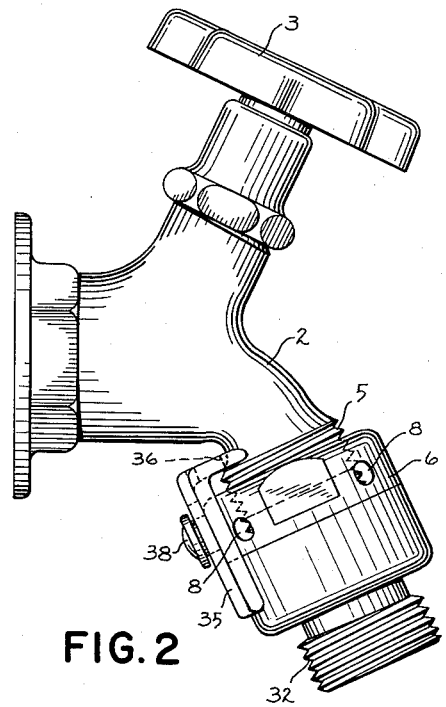
FIG. 2 is a side elevation similar to FIG. 1, but showing the vacuum breaker partially unscrewed on the screw threaded spout of the sill-cock to permit draining.

FIGS. 1 and 2 show a vacuum breaker, indicated generally at 1, mounted on an ordinary outside valve type of sill-cock 2, having the valve operating handle 3, and which sill-cock has a screw-threaded spout 5. The inlet member 6 of the vacuum breaker is provided with an internal screw thread 7 adapted for engagement with a sill-cock screw threaded spout 5, or the like.

The inlet member 6 is provided with one or more drainage openings 8 for the purposes hereinafter described, and the inlet member 6 is provided with flattened portions 10 forming, conveniently, wrench hold surfaces. The bottom of the screw threaded portion 7 of the inlet member 6 is provided with a reduced diameter portion in which is positioned a resilient washer 12 having an opening 13 therethrough of substantially the diameter of the chamber formed in said inlet member 6.

As fully described in my said co-pending application, Serial No. 780,807, the inlet member 6 is provided with a substantially flat and smooth valve seat surface 15 which has a series of openings 16 therethrough to permit the flow of water to pass through the inlet member 6.

A substantially flat diaphragm valve member 17, made of any suitable flexible and resilient material and provided with cross slits therethrough at its central portion, is clamped near its outer periphery between a relatively sharp annular projection 18 of the inlet member 6 and the annular seating surface 20 formed in the cap member 21. The inlet member 6 has an external screw-thread at its lower portion and the outlet cap member 21 is provided with an internal screw thread at its upper portion. The inlet member 6 and outlet cap member 21 are tightly screwed together, as indicated at 23, so as to form a water-tight joint around the outer edge of the diaphragm member 17.

The outlet cap member 21 is provided with a relatively sharp annular seating surface 25 extending toward the diaphragm 17; and the outlet cap member 21 is provided with a circumferential series of air inlets 26, or vacuum ports, between the diaphragm 17 and the annular seating surface 20.

I find it preferable under certain flow conditions to provide the diaphragm 17 with means to assure that the vacuum breaker will function properly even under most severe conditions of maximum flow of water for long periods of time through the outlet 31 of the cylindrical chamber 28 of the outlet cap member 21. Such means include a spider arm shaped element 29 continually stressed upwardly, as in FIG. 3, by a coil spring 30, the upper end of which is engaged in grooves formed in the periphery of the spider arms of the element 29 and with the lower end of the spring 30 positioned in an offset formed at the bottom of the cap member 21.

The lower portion of the cap member 21 is provided with an external screw thread 32 adapted for engagement with the internal screw thread of a hose coupling member 33, or the like.

Figure 4:
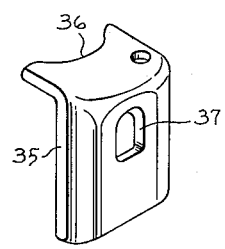
FIG. 4 is a perspective view of the tamper-proof motion limiting member shown in FIGS. 1 and 2.

To prevent removal of the vacuum breaker 1 from the sill-cock screw nozzle threaded end 5, a tamper-proof motion limiting member 35 is provided. The motion limiting member 35 shown is of an inverted L-shape, or hook shape, with a short inwardly projecting top portion provided with a curved portion 36 adapted to engage the circular surface of the sill-cock 2 above the top of the threaded portion 5. As best shown in FIG. 4, the curved portion 36 is of a curvature which forms two spaced apart prong-like projections. The member 35 has an elongated opening 37 therethrough.

Figure 3:
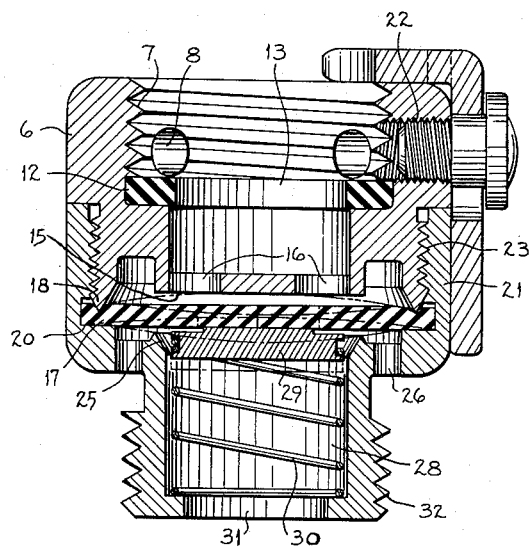
FIG. 3 is an axial vertical sectional view of the vacuum breaker shown in FIGS. 1 and 2 but on a larger scale.

The member 35 is mounted on the inlet member 6 of vacuum breaker 1 by means of a tamper-proof screw 38 engaged in a screw threaded opening 22, formed in the upper part of the inlet member 6. The screw 38 is of the type which is provided with a small socket of a particular configuration and in which a wrench of the same configuration may be inserted to effect turning of a screw. As shown in FIG. 3, the screw 38 has a smooth shank portion which is slightly greater in length than the thickness of the member 35 and said smooth shank portion of the screw 38 is of lesser diameter than the length of the elongated opening 37.

Accordingly, when the screw 38 is inserted through the opening 37 and tightly screwed in the screw threaded opening 22 of the inlet member 6, the motion limiting member 35 is capable of limited motion which will permit the vacuum breaker 1 to be unscrewed on the sill-cock threaded end 5 about 1 or 2 turns of the vacuum breaker 1. Such limited unscrewing is sufficient to open the drain opening, or openings, 8, to atmosphere, but is not sufficient to permit removal of the vacuum breaker 1 from the sill-cock 2.

When the vacuum breaker 1 is used on a sill-cock having its valve in the head which is outside the building, and which type of sill-cock is ordinarily installed with a "stop-and-waste" valve in the supply pipe within the building; one drain hole 8 may be sufficient, as the waste vent of the "stop-and-waste" valve may be opened to permit air to enter the pipe as the water drains out through a drain opening 8.

When the vacuum breaker 1 is installed on a "freezeless" type sill-cock wherein the sill-cock valve is located inside the building and the sill-cock head and exposed piping are drained automatically after each operation, and no vent or waste valve is available to permit air to enter the pipe, drainage cannot be accomplished through a single drain hole of a size at all practical. Accordingly, several drain holes 8, and at least three such drain holes, are spaced around the circumference of the inlet member 6 of the vacuum breaker 1. The nozzles of the sill-cocks are invariably designed to extend outwardly on an angle of approximately 30° from the wall to facilitate the attachment of hose couplings, etc. When a multiple number, at least three, equally spaced drain holes are formed in the inlet member 6, all such drain holes will be opened to atmosphere contemporaneously and one hole will always be higher than the others. Accordingly, air may enter through this higher drain hole to permit the water to drain out through the other drain openings.

I do not desire to limit myself to the precise details of construction and arrangement as herein set forth, as it is obvious that various modifications may be made therein without departing from the essential features of my invention as defined in the appended claims.

I claim:

1. A vacuum breaker for use with the exterior threaded end of an outlet nozzle, comprising a body member having interior screw threaded means at the inlet thereof; a fluid passageway through said body member; automatic fluid passageway closing means within said body member; automatic vacuum preventing air port means within said body member; telescoping stop means axially slidably mounted on the outside of said body member, said stop means having an inturned flange above said interior screw threaded means, said inturned flange extending radially inwardly beyond the maximum diameter of said interior screw threaded means; and a drain hole through the outer wall of said body member, and located between said interior screw threaded means and said fluid passageway closing means.

2. A vacuum breaker adapted to be attached to the exterior threaded end of an outlet nozzle, comprising a body member having interior screw threaded means at the inlet thereof; a fluid passageway through said body member; automatic fluid passageway closing means; axially movable stop means mounted on the outside of said body member, said stop means having an inturned projection above said interior screw threaded means, said inturned projection extending radially inwardly beyond the outer diameter of said interior screw threaded means; and a drain hole through the exterior wall of said body member, said drain hole being located between said interior threaded means and said automatic fluid passageway closing means.

References Cited in the file of this patent
UNITED STATES PATENTS

| | | |
|---|---|---|
| 1,944,191 | Newmark | Jan. 23, 1934 |
| 2,215,599 | Fulberg | Sept. 24, 1940 |
| 2,875,776 | Skipwith | Mar. 3, 1959 |